No. 836,408. PATENTED NOV. 20, 1906.
W. F. SOMES.
ROTARY SHAFT PACKING.
APPLICATION FILED JAN. 24, 1906.

Witnesses.
A. C. Ratigan
L. E. Kennedy

Inventor.
Walter F. Somes
by Wright, Brown, Quinby & May
Attys.

UNITED STATES PATENT OFFICE.

WALTER F. SOMES, OF BOSTON, MASSACHUSETTS.

ROTARY-SHAFT PACKING.

No. 836,408.　　　Specification of Letters Patent.　　　Patented Nov. 20, 1906.

Application filed January 24, 1906. Serial No. 297,591.

*To all whom it may concern:*

Be it known that I, WALTER F. SOMES, of Boston, in the county of Suffolk and State of Massachusetts, have invented certain new and useful Improvements in Rotary-Shaft Packings, of which the following is a specification.

The present invention relates to metallic packing to prevent leakage of steam or other fluid from a valve-chest or cylinder along the rod or spindle of a rotary valve or shaft of a rotary engine.

It is the object of the invention to provide a metallic packing for rods or shafts of the character referred to which will make a steam or fluid tight joint and will increase in efficiency with use.

To that end the invention consists in the construction hereinafter described and claimed.

Figure 1:
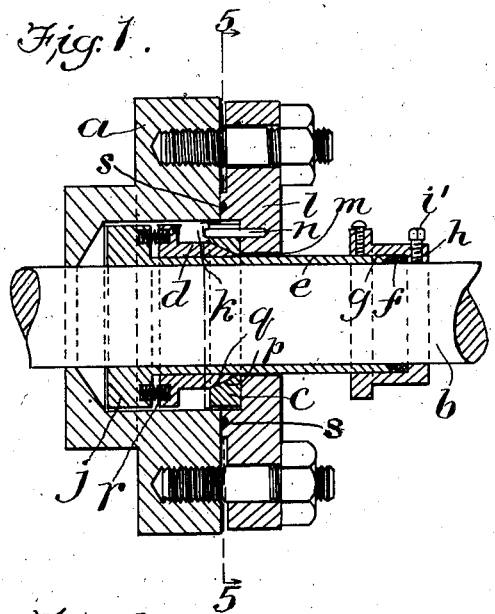
Figure 2:
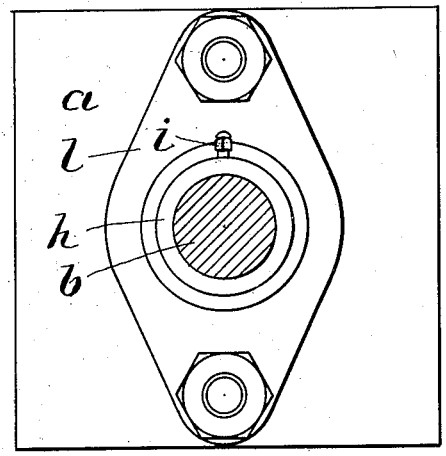
Figure 3:
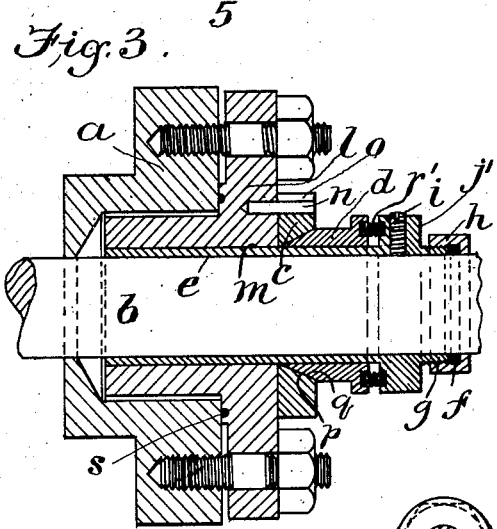
Figure 4:
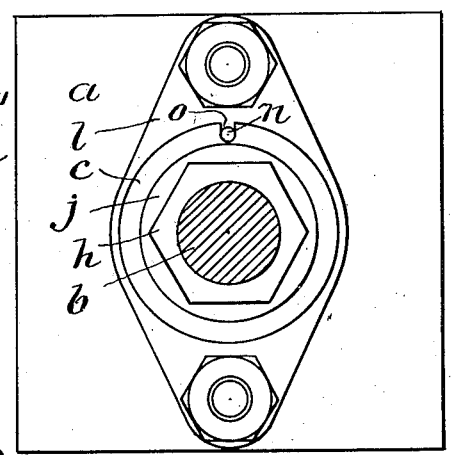
Figure 5:
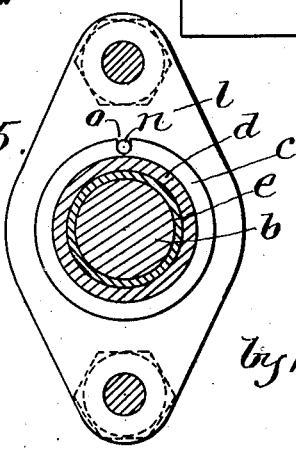

Of the accompanying drawings, Figure 1 represents a sectional view of a packing embodying my invention contained internally in a casing-wall. Fig. 2 represents an elevation of the same. Fig. 3 represents a similar packing mounted externally of the casing-wall. Fig. 4 represents an elevation of the same. Fig. 5 represents a cross-section on line 5 5 of Fig. 1 looking in the direction of the arrow.

The same reference characters indicate the same parts in all the figures.

*a* represents the wall of a chamber adapted to contain fluid, which chamber may be a valve-chest, a rotary-engine cylinder, the casing of a rotary pump, turbine, or any other kind of a chamber in which fluid under pressure is maintained, which also contains a moving part to or from which motion is carried by a shaft extending through a wall or head of the chamber.

*b* represents the rod or spindle of a rotary valve or the shaft of a rotary engine, pump, turbine, &c.

The joint between the casing-wall *a* and the shaft *b* is packed, so as to prevent leakage of fluid by means of packing, of which the main essentials are a plate or annulus *c*, surrounding the shaft and separated therefrom, and a sleeve *d*, also surrounding the shaft. The sleeve may be mounted directly upon the shaft, but preferably there is used an intermediate sleeve *e*, which fits closely upon the shaft and forms a support for the packing-sleeve *d*. Sleeve *e* is fitted as tightly as possible upon the shaft, so as to minimize leakage, and it is also packed, so as absolutely to prevent leakage by packing *f*, inclosed between the flared end *g* of the sleeve and a gland *h*, screwed thereon. The packing may be of soft metal, such as lead, or of fiber or any other material usual for this purpose. The tight fit of sleeve *e* and of the packing would tend to cause the sleeve to rotate or oscillate with the shaft *b;* but in order to prevent any possibility of slipping the set screw or bolt *i* is provided, which may extend through the sleeve and also through a flange *j'* into contact with the shaft, or it may pass through the gland *h*, as shown at *i'* in Fig. 1.

Fig. 1 represents a construction in which the packing is contained in a recess *k* of the chamber-wall, while in Fig. 3 the packing is exterior to the wall. In either case I provide a plate *l*, which has a bore *m*, through which the shaft and sleeve *e* pass and which is secured to the chamber-wall and extends over and covers the annular recess *k* of the chamber-wall, having the inside packing. The annulus *c* is held by the plate *l* by means of a dowel-pin *n*, mounted on the plate and extending into a slot *o* in the member *c*. This prevents the annulus from rotating, but allows it to move slightly in a straight line, so as to permit a slight amount of lateral play of the shaft.

The ring or plate *c* has a bore *p*, which is tapered, forming a concave conical surface, and the packing-sleeve *d* has a complemental taper *q* upon its end, which forms a conical surface fitting against the surface *p* of the annulus when the two members are forced together. Interposed between the flange *j* and sleeve *d* is a series of springs *r*, which exert their pressure in a direction tending to force the end of the sleeve *d* into the bore of member *c* and into contact with the conical surface *p*. Similarly in Fig. 3 the shoulder or flange *j'* on sleeve *e* serves as an abutment for springs *r'*, which bear against the sleeve *d* of the outside packing and force it against the complemental member *c*. By reason of the beveled surfaces *p q* a wedging action takes place, which causes considerable pressure and a very tight joint between the members *c* and *d*, so that leakage of steam through the joint between them is practically impossible. Further, on account of the same wedging action and also because the sleeve *d* is made of a soft metal, preferably Babbitt metal, the thin edge of the beveled end of the latter is crowded tightly against the outer surface of sleeve *e*, forming a tight joint therewith, which prevents steam from leaking between the sleeves $e$ and $d$. As the shaft $p$ rotates or oscillates sleeve $d$ is caused to turn with it by means of the tightness of its fit on sleeve $e$ and also because of the springs $r$ and holding-pins, (not shown,) which are usually provided, and its beveled end rubs against the member $c$, polishing the contacting surfaces, while as fast as the sleeve wears away springs $r$ continue to hold it in firm engagement with the member $c$, which is of brass or some other metal harder than Babbitt, and thus a close union is always secured. The smoothness of the surfaces in contact is increased by wear and use. Consequently the bearing of one upon the other and the tightness of their connection is made more complete and the efficiency of the packing as a leakage-preventer is increased. The rotary motion of the sleeve and the constant pressure of springs $r$ also tend to crowd the beveled edge of the sleeve into closer and yet closer contact with sleeve $e$, so that in this respect also its efficiency is increased by use.

It is to be understood that the packing may be used internally and placed within the recess $k$ of wall $a$, or it may be wholly external to said wall, as determined by circumstances. Also both arrangements may be used at the same time upon a single shaft. In this case there is an annulus $c$ placed upon each side of the plate $l$, and two sleeves $d$ are mounted upon the shaft, one being in engagement with each of the members $c$. The other elements of both arrangements of the packing may also be used without requiring any alteration or modification of either form.

It is to be understood that the particular arrangement of parts above described is not essential and is not the only possible embodiment of my invention, but that the invention embraces in its broadest aspect any construction of packing consisting of a plurality of members, one of which is stationary and the other rotary and of which also one is of soft metal, while the other is of a harder material. The surfaces in contact of these members are not necessarily beveled or inclined with respect to the shaft, but may be perpendicular thereto, and if beveled may be formed on any curve of revolution, as well as conical. In any case the action which forms the essential principle of the invention will take place, this action being that of spinning the softer metal by reason of the relative rotation of the members and the pressure forcing them in contact, so that a portion of the softer member is forced into the spaces through which leakage might take place, so as to tightly close such spaces. It is also not essential that the packing-sleeve $d$ be placed outside of the sleeve $e$, since it might equally well be inclosed within a sleeve of greater diameter and forced outwardly by the spinning action, so as to close the space between itself and such sleeve.

In another aspect the invention comprises, broadly, the use of a protective sleeve or bushing surrounding the rotary rod or shaft, so that the latter will not be worn away by its rotation relatively to a stationary packing. Hitherto rotary valve-spindles, engine-shafts, &c., have been packed by means similar to those used for reciprocating rods, and as a result annular grooves have been worn in them, impairing the value of the packing and rendering efficient repacking difficult. By using a protective cover, such as the sleeve $e$, any of the old known forms of stationary packing may be used instead of the sleeve $d$, and then the wear will all be taken up on the sleeve $e$. This sleeve may be shifted as it becomes worn and new ones substituted with much less inconvenience and expense than is required to turn down the shaft $b$ or furnish a new one.

I claim—

1. Packing for rotary or oscillatory rods or shafts, comprising a sleeve surrounding the rod or shaft engaging the same to turn therewith and having on its end an external cone portion, an abutment having an internal coöperating conical surface, and means tending to press the cone portion of said sleeve into leakage-preventing engagement with the conical surface of said abutment.

2. Packing for rotary or oscillatory rods or shafts, comprising a sleeve of relatively soft metal surrounding the rod or shaft mounted to turn therewith and externally beveled on its end, an abutment having an internal coöperating conical surface, and means tending to press the beveled end of said sleeve into leakage-preventing engagement with the conical surface of said abutment.

3. Packing for rotary or oscillatory rods or shafts, comprising a sleeve surrounding the rod or shaft and having on its end an external cone portion, an abutment having an internal coöperating conical surface, a shoulder fixed to the rod or shaft and movable therewith, and means interposed between and bearing against said shoulder and sleeve tending to press the cone portion of said sleeve into leakage-preventing engagement with the conical surface of said abutment.

4. Metallic packing comprising a sleeve of soft metal adapted to be mounted on an oscillatory or rotary rod or shaft so as to turn therewith and prevent leakage of fluid, said sleeve having an external beveled end, an abutment of a material harder than the sleeve having a beveled recess fitting the end of the sleeve, and means pressing the sleeve into said recess.

5. Metallic packing comprising a packing-sleeve adapted to be mounted on an oscillatory or rotary rod or shaft so as to turn therewith, and tapered externally to a thin edge, a stationary abutment or gland having a tapered bore adapted to surround the rod and coöperate with the sleeve, and means pressing the sleeve into the bore of said abutment, whereby the thin edge of the sleeve is forced tightly against the rod to prevent leakage of fluid past the same.

6. In combination with a rotary rod or shaft and the wall of a pressure-chamber through which the rod passes, a plurality of complemental packing members surrounding the rod having externally and internally tapered surfaces in contact with each other, one of said members being rotatable with the rod relatively to the other, and one member being of softer metal than the other, and means pressing the tapered surfaces in contact, whereby, and on account of the relative rotation of the members, the beveled edge of the softer member is distorted and made to close the leakage-space around the rod.

7. In combination with a rotary rod or shaft, a packing-sleeve beveled on its end to a thin edge surrounding the rod and mounted to turn therewith, a stationary abutment having an interior beveled surface surrounding the rod, and means pressing the sleeve end against said beveled surface, whereby the sleeve end is forced into leakage-preventing contact with the rod and abutment.

8. In combination with a rotary rod or shaft, a packing-sleeve beveled on its end to a thin edge surrounding the rod, an abutment having an interior beveled surface surrounding the rod, a collar fixed to the rod, and springs interposed between the collar and sleeve pressing the sleeve end against said beveled surface, whereby the sleeve end is forced into leakage-preventing contact with the rod and abutment.

9. In combination with a rotary rod or shaft, a sleeve in tight engagement with the rod and provided with a shoulder, a packing-sleeve surrounding the first sleeve and having its end beveled externally, a ring surrounding the rod formed with an internal bevel, and springs interposed between said shoulder and packing-sleeve acting to wedge the beveled end of the latter against the bevel in the ring, whereby said end is crowded against the inner sleeve.

10. In combination with a rotary rod or shaft, a sleeve secured to the rod or shaft to turn therewith, a gland adjacent the end of said sleeve, packing surrounding the rod between the sleeve and gland, a packing-sleeve and a ring having complementary beveled surfaces surrounding the first sleeve, and means forcing said beveled surfaces together.

11. In combination with a rotary rod or shaft, a sleeve secured to the rod or shaft to turn therewith and having a shoulder, a gland adjacent the end of said sleeve, packing surrounding the rod between the sleeve and gland, a packing-sleeve and a ring having complemental beveled surfaces surrounding the first sleeve, and springs between said shoulder and packing-sleeve forcing said beveled surfaces together.

12. In combination with a casing-wall and a rotary rod or shaft passing therethrough, packing for the joint between the wall and rod comprising a plate having a tapered bore surrounding the rod and held by the wall against rotation, and a beveled sleeve mounted on the rod to turn therewith and held with a constant resilient pressure in the bore of the plate and against the tapered sides thereof.

13. In combination with a casing-wall and a rotary rod or shaft passing therethrough, packing for the joint between the wall and rod comprising a plate having a tapered bore surrounding the rod and held by the wall against rotation but with provision for linear play, and a beveled sleeve mounted on the rod to turn therewith and held with a constant resilient pressure in the bore of the plate and against the tapered sides thereof.

14. In combination with a casing-wall and a rotary rod or shaft passing therethrough, packing for the joint between the wall and rod comprising a plate having a tapered bore surrounding the rod and held by the wall against rotation, the holding means consisting of a pin extending into a slot in the plate, which permits linear play, and a beveled sleeve mounted on the rod to turn therewith and held with a constant resilient pressure in the bore of the plate and against the tapered sides thereof.

15. In combination with a casing-wall and a rotary rod or shaft passing therethrough, a plate secured to the wall, having an orifice for the rod, and covering an annular recess in the wall, packing for the joint between the wall and rod comprising a ring on each side of said plate having a tapered bore surrounding the rod, beveled sleeves mounted on the rod, one within said recess of the casing-wall, and each engaging one of the rings in the tapered bore thereof, and means holding said sleeve in constant engagement with the rings.

16. Metallic packing for a rotary shaft comprising coöperating annular members having complemental beveled surfaces surrounding the shaft, one of said members being stationary and the other turning with the shaft, and means forcing said surfaces together.

17. Metallic packing for a rotary shaft comprising coöperating annular members having complemental beveled exterior and interior surfaces surrounding the shaft, the member having the exterior beveled surface being of softer metal than the other, and means forcing the members together, whereby the beveled portion of the softer member is crowded against the shaft.

18. Metallic packing for a rotary shaft comprising relatively rotary and stationary members surrounding the shaft, and one of said members being softer than the other, and means forcing the members into contact, whereby the softer member is caused to change its shape and close the leakage-space.

19. In combination with a rotary rod or shaft and a casing-wall through which the rod passes, a sleeve or bushing mounted on the rod and turning therewith, and metallic packing between said sleeve and the casing-wall, the sleeve serving to prevent wearing of the shaft by the packing.

In testimony whereof I have affixed my signature in presence of two witnesses.

WALTER F. SOMES.

Witnesses:
L. E. KENNEDY,
A. C. RATIGAN.